(12) United States Patent
Kim et al.

(10) Patent No.: US 10,788,597 B2
(45) Date of Patent: Sep. 29, 2020

(54) GENERATING A REFLECTIVITY MODEL OF SUBSURFACE STRUCTURES

(71) Applicant: Saudi Arabian Oil Company, Dhahran (SA)

(72) Inventors: Young Seo Kim, Abqaiq (SA); Ali Ameen Almomin, Dammam (SA); Woodon Jeong, Dhahran (SA); Constantinos Tsingas, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 381 days.

(21) Appl. No.: 15/837,335

(22) Filed: Dec. 11, 2017

(65) Prior Publication Data
US 2019/0179047 A1 Jun. 13, 2019

(51) Int. Cl.
*G01V 1/28* (2006.01)
*G01V 1/30* (2006.01)
*G01V 1/37* (2006.01)

(52) U.S. Cl.
CPC .............. *G01V 1/282* (2013.01); *G01V 1/30* (2013.01); *G01V 1/306* (2013.01); *G01V 1/375* (2013.01); *G01V 2210/66* (2013.01)

(58) Field of Classification Search
CPC .......... G01V 1/282; G01V 1/30; G01V 1/306; G01V 1/375; G01V 2210/66
See application file for complete search history.

(56) References Cited

U.S. PATENT DOCUMENTS

| 8,116,168 | B1 | 2/2012 | Luo | |
| 8,694,299 | B2 * | 4/2014 | Krebs | G01V 11/00 |
| | | | | 703/10 |

(Continued)

FOREIGN PATENT DOCUMENTS

CN 105974470 9/2016

OTHER PUBLICATIONS

Dai et al., "Multi-source least-squares reverse time migration," Geophysical Prospecting 60(4), Mar. 2012, 15 pages.

(Continued)

*Primary Examiner* — Ian J Lobo
(74) *Attorney, Agent, or Firm* — Fish & Richardson P.C.

(57) ABSTRACT

The present disclosure describes methods and systems, including computer-implemented methods, computer program products, and computer systems, for generating a reflectivity model for a subsurface area. One method includes: receiving a set of seismic data associated with the subsurface area; generating analytic source wavefields; generating analytic residual wavefields based on the set of seismic data and an initial reflectivity model; decomposing the analytic source wavefields and the analytic residual wavefields to obtain down-going and up-going components of the analytic source wavefields and the analytic residual wavefields; calculating a gradient vector using the down-going components of the analytic source wavefields and the up-going components of the analytic residual wavefields; calculating a source illumination factor using the down-going components of the analytic source wavefields; calculating a preconditioned gradient vector, based on the gradient vector and the source illumination factor; and generating an updated reflectivity model based on the preconditioned gradient vector.

20 Claims, 9 Drawing Sheets

(56) References Cited

U.S. PATENT DOCUMENTS

| | | | |
|---|---|---|---|
| 9,536,143 B2 | 1/2017 | Jiang | |
| 9,702,998 B2 | 7/2017 | Bansal | |
| 10,054,714 B2* | 8/2018 | Denli | G01V 99/005 |
| 2012/0221248 A1* | 8/2012 | Yarman | G01V 1/282 |
| | | | 702/16 |
| 2013/0311149 A1 | 11/2013 | Tang et al. | |
| 2014/0301158 A1 | 10/2014 | Zhang | |
| 2015/0012256 A1 | 1/2015 | Routh et al. | |
| 2015/0057938 A1 | 2/2015 | Krohn et al. | |
| 2017/0192118 A1* | 7/2017 | Du | G01V 1/282 |
| 2018/0059276 A1* | 3/2018 | Roberts | G01V 1/362 |

OTHER PUBLICATIONS

Denli and Huang, "Elastic-wave reverse-time migration with a wavefield-separation imaging condition," 78th Annual International Meeting, SEG, Expanded Abstracts, Nov. 9-14, 2008, 5 pages.

Kim et al., "Estimated source wavelet-incorporated reverse-time migration with a virtual source imaging condition," Geophysical Prospecting 61, Jan. 15, 2013, 17 pages.

Liu et al., "An effective imagining condition for reverse-time migration using wavefield decomposition," Geophysics 76(1), Jan. 2011, 11 pages.

Liu et al., "Reverse time migration of internal multiples," 83rd Annual International Meeting, SEG, Expanded Abstracts, Sep.-Oct. 2015, 11 pages.

Nocedal and Wright, "Numerical optimization," Springer series in operations research and financial engineering, Jul. 27, 2006, 651 pages.

Tarantola, "Inversion of seismic reflection data in acoustic approximation," Geophysics 49(8), Aug. 1984, 8 pages.

Fei et al., "Removing false images in reverse time migration: The concept of de-primary," Geophysics 80(6), Sep. 2015, 8 pages.

Whitmore, "A Generalization of RTM Inverse Scattering Imaging Conditions," 75th EAGE Conference and Exhibition incorporating SPE EUROPEC, Jun. 10-13, 2013, 5 pages.

Zhu et al., "Elastic imagining and time-lapse migration based upon adjoint methods," Geophysics 74(6), Nov.-Dec. 2009, 11 pages.

Hu et al., "Angle gathers for reverse time migration using analytic wavefield propagation and decomposition in the time domain," Geophysics vol. 81, No. 1, Oct. 13, 2015, 9 pages.

Kim et al., "3D Least squares reverse time migration using analytic-signal based wavefield decomposition via Hilbert Transform—Extended Abstract," Geophysics, Jun. 12, 2017, 5 pages.

Yao et al., "Least-squares reverse-time migration for reflectivity imaging," Science China Earth Sciences, vol. 58, No. 11, Nov. 30, 2015, 11 pages.

* cited by examiner

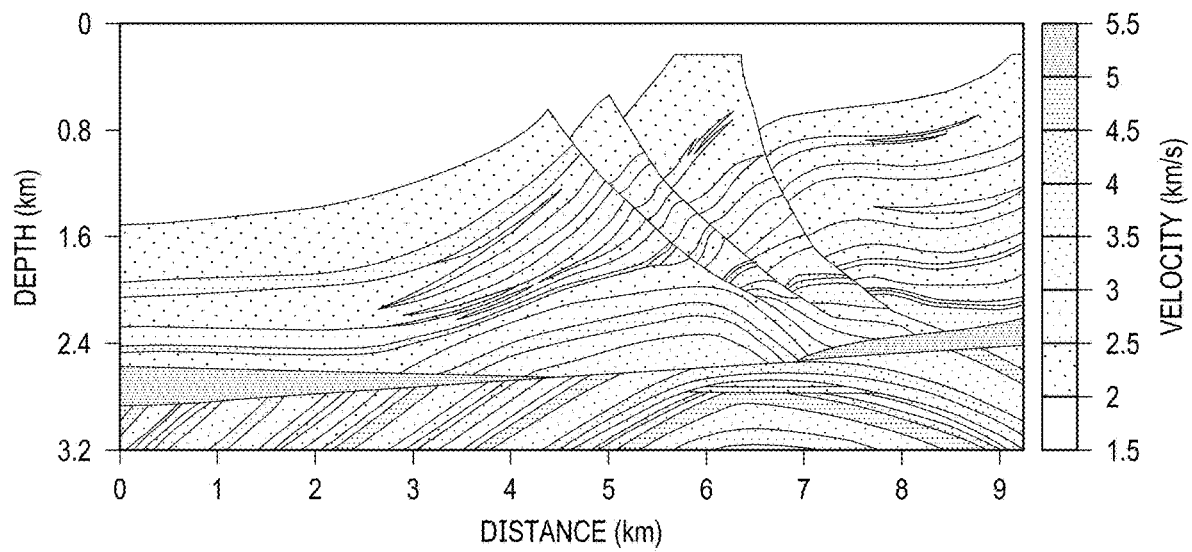
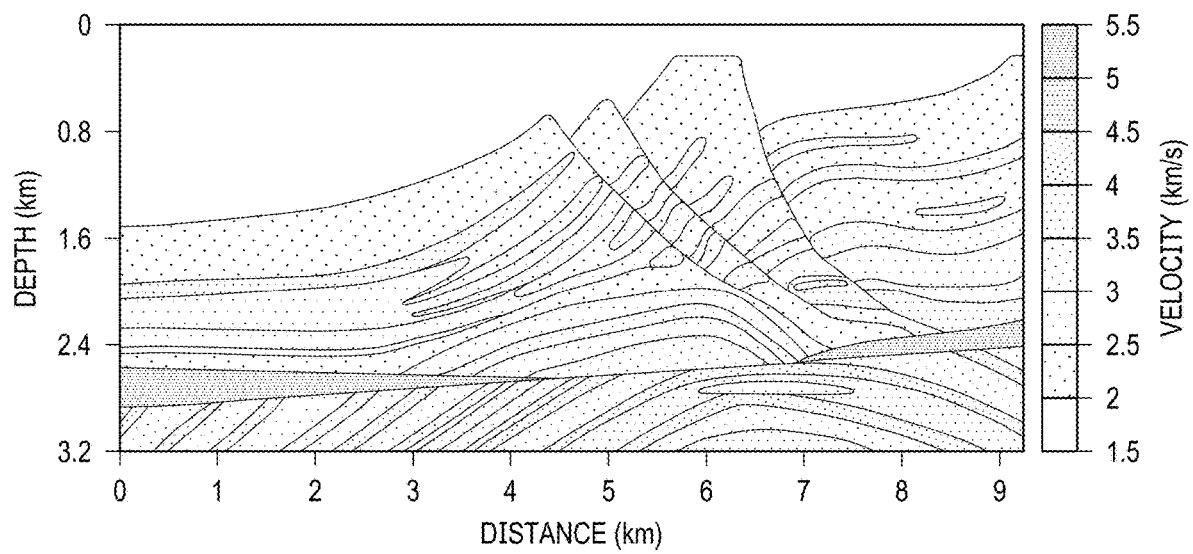

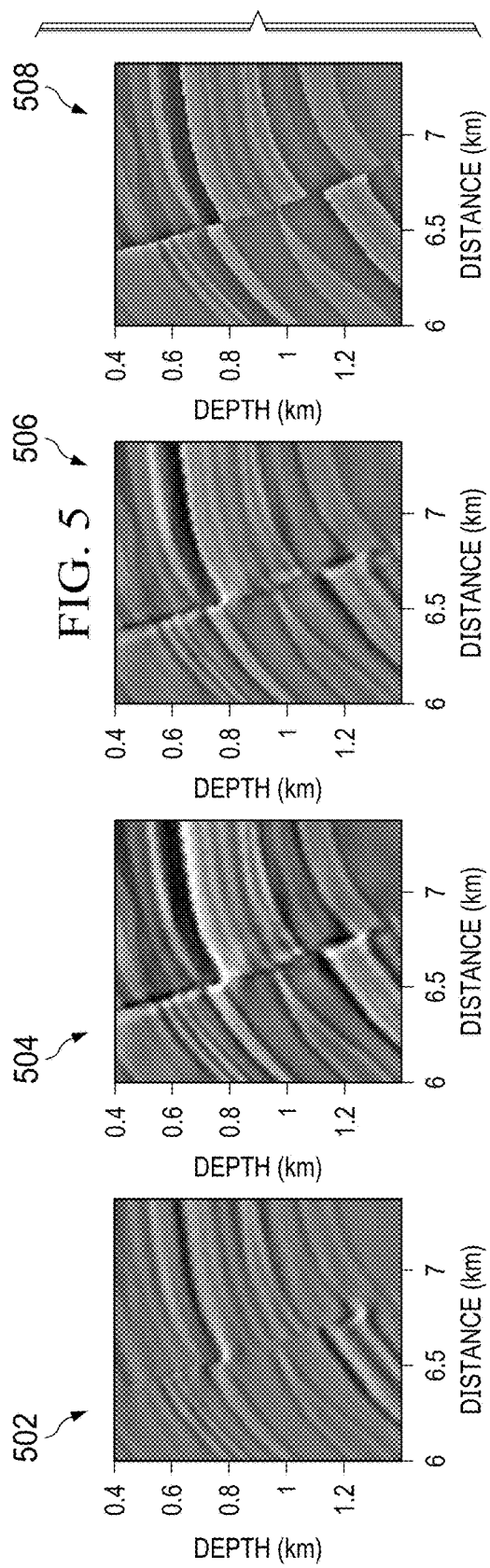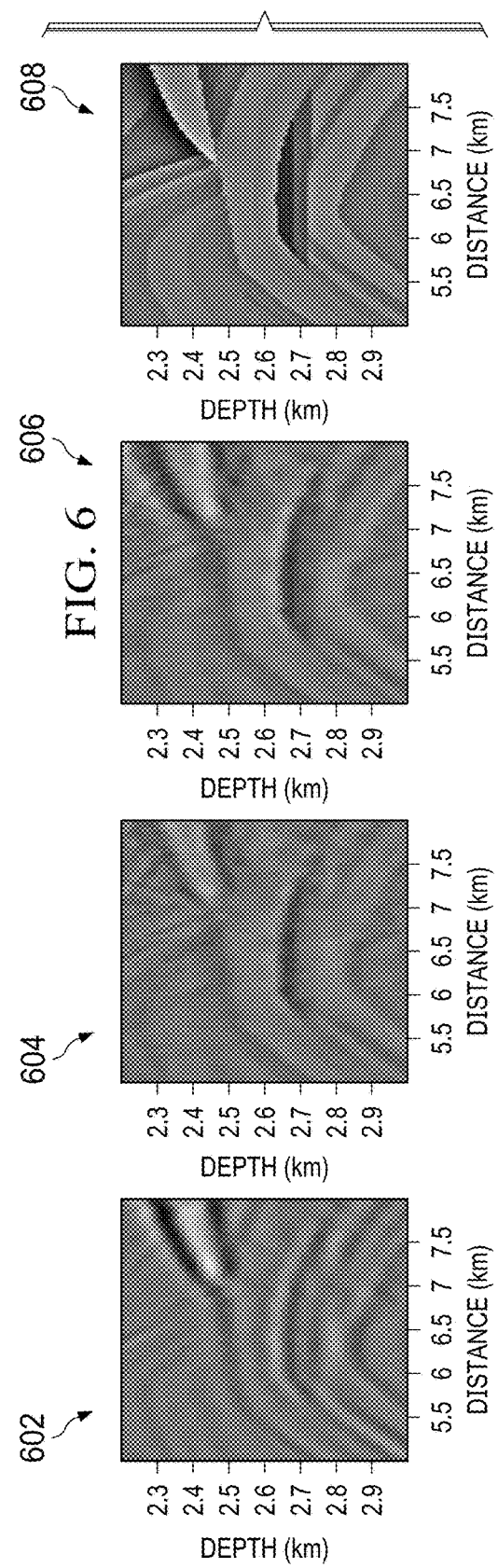

10,788,597 B2

GENERATING A REFLECTIVITY MODEL OF SUBSURFACE STRUCTURES

TECHNICAL FIELD

This disclosure relates to generating a reflectivity model of subsurface structures.

BACKGROUND

In a geophysics analysis, a reflectivity model is used in generating images of the subsurface structure. A reflectivity model indicates the reflection properties of the subsurface structure. In some cases, the reflectivity model can be used to simulate the propagation of a reflected signal in the subsurface structure. The reflectivity model is an important factor that affects the quality of the image of the subsurface structure. A good reflectivity model can be used to generate more accurate images of the subsurface structure.

SUMMARY

The present disclosure describes methods and systems, including computer-implemented methods, computer program products, and computer systems for generating a reflectivity model. One computer-implemented method for generating a reflectivity model for a subsurface area includes: receiving, by a data processing apparatus, a set of seismic data associated with the subsurface area; generating, by the data processing apparatus, analytic source wavefields; generating, by the data processing apparatus, analytic residual wavefields based on the set of seismic data and an initial reflectivity model; decomposing the analytic source wavefields and the analytic residual wavefields to obtain down-going and up-going components of the analytic source wavefields and the analytic residual wavefields; calculating, by the data processing apparatus, a gradient vector using the down-going components of the analytic source wavefields and the up-going components of the analytic residual wavefields; calculating, by the data processing apparatus, a source illumination factor using the down-going components of the analytic source wavefields; calculating, by the data processing apparatus, a preconditioned gradient vector, based on the gradient vector and the source illumination factor; and generating, by the data processing apparatus, an updated reflectivity model based on the preconditioned gradient vector.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, cause the system to perform the actions. One or more computer programs can be configured to perform particular operations or actions by virtue of including instructions that, when executed by data processing apparatus, cause the apparatus to perform the actions.

The details of one or more implementations of the subject matter of this specification are set forth in the accompanying drawings and the subsequent description. Other features, aspects, and advantages of the subject matter will become apparent from the description, the drawings, and the claims.

DESCRIPTION OF DRAWINGS

FIG. 2A illustrates an example image representing a modified Marmousi model, according to an implementation.

FIG. 2B illustrates an example image representing a smoothed Marmousi model, according to an implementation.

FIG. 5 illustrates example enlarged shallow parts of reflectivity model images obtained by different migration algorithms, according to respective implementations.

FIG. 6 illustrates example enlarged deep parts of reflectivity model images obtained by different migration algorithms, according to respective implementations.

Like reference numbers and designations in the various drawings indicate like elements.

DETAILED DESCRIPTION

Figure 1:
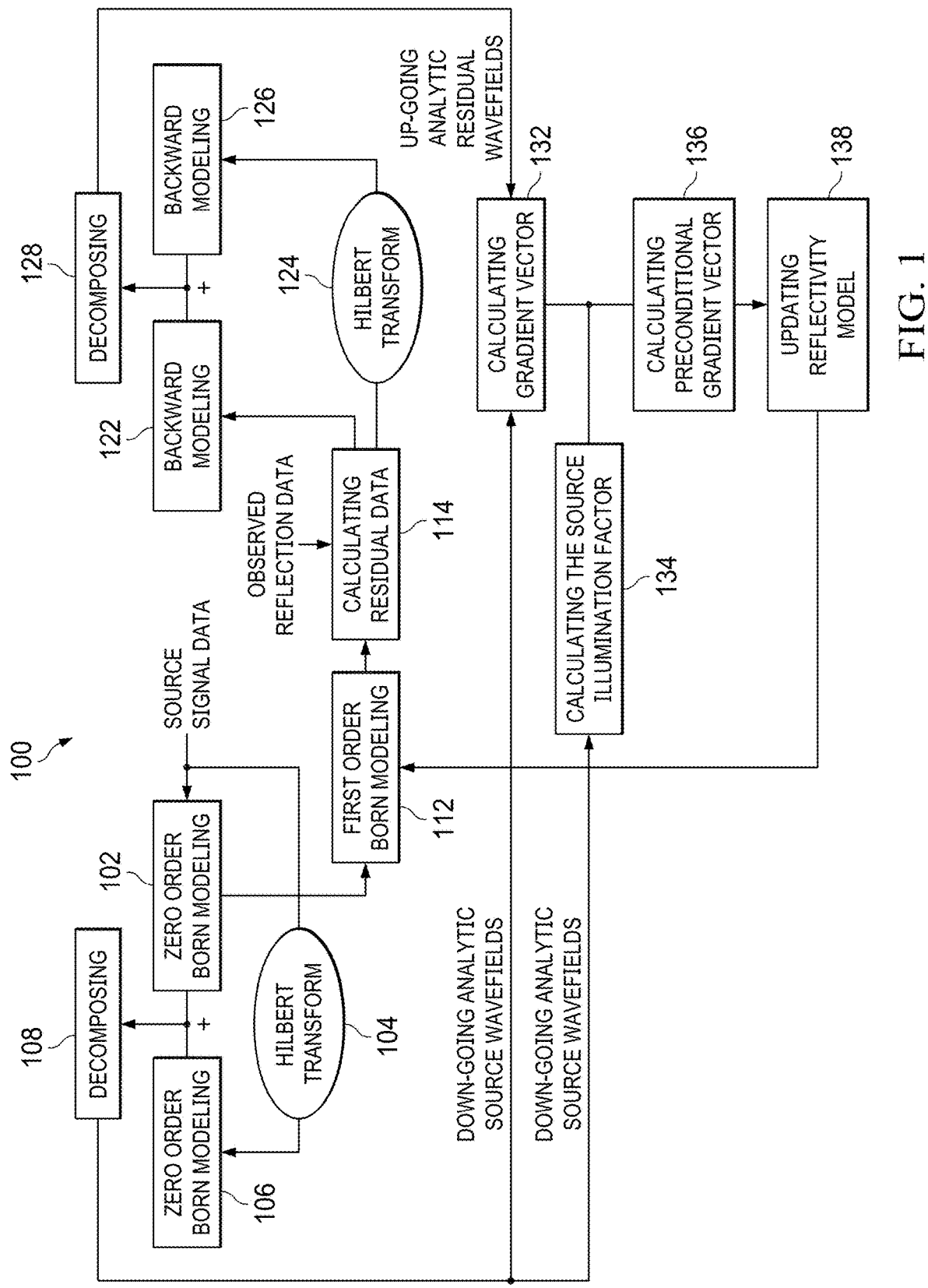
FIG. 1 illustrates an example reflectivity model generating process, according to an implementation.

The following description is presented to enable any person skilled in the art to make and use the disclosed subject matter, and is provided in the context of one or more particular implementations. Various modifications to the disclosed implementations will be readily apparent to those skilled in the art, and the general principles defined in this disclosure may be applied to other implementations and applications without departing from scope of the disclosure. Thus, the present disclosure is not intended to be limited to the described or illustrated implementations, but is to be accorded the widest scope consistent with the principles and features disclosed in this disclosure.

This disclosure generally describes methods and systems, including computer-implemented methods, computer program products, and computer systems, for generating a reflectivity model. In some cases, seismic signals can be transmitted into the subsurface of the earth, at a source location by a source device. Examples of the seismic signals include acoustic signals. The seismic signals travel through the subsurface and can be received by a receiver device placed at a receiver location. In some cases, the source device, the receiver device, or a combination thereof can be placed at the surface. The signals can propagate downwards until they reach a reflecting structure and reflect upwards, towards the surface. Because the signals have refracted and reflected through the substructure, the characteristics of the received signals contain information of the substructure. The received signals can be analyzed to produce images of the subsurface structure.

In a marine survey, air guns and hydrophones can be used as the source devices and the receiver devices, respectively. During the acquisition, seismic sources are exploded from arrays of air guns. The reflected and refracted signals are acquired by streamers of hydrophones. In a land acquisition, dynamite can be used as an explosive source and a geophone is employed as a receiver device. In another example, vibratory trucks can be used as source devices. Other devices that generate and receive seismic signals can also be used.

In some cases, seismic data including the sampled received signals can be collected to build common image gathers (CIGs), or common reflection points (CRP). In a geophysics analysis, CIGs refer to subsets of the whole image with fixed surface location for measuring variations between the partial images at fixed image points. If the partial images are a function of the reflection angles, the corresponding CIGs are referred to as Common Angle Gathers (CAGs) or Angle Domain Common Image Gathers (ADCIGs).

In some cases, the CAGs can be used to determine amplitude variation with angle analysis, migration velocity quality control and migration velocity analysis. When the migration velocity is correct, the images from various incident angles focus on the same depth, thus generating flat events on the CAGs. In contrast, when the velocity has errors, the events in CAGs become non-flat. Measuring of residual moveout from the non-flat events can be used for estimating the migration velocity. Such velocity estimation can be carried out by using computer tomography algorithms. The estimated migration velocity can be used to refine the velocity model and determine the correct velocity for signal propagating through the substructure. With a correct velocity model, the images of the substructure can be generated based on the collected seismic data.

In some implementations, reverse time migration (RTM) can be used in analysis migrations. The RTM algorithm includes calculations of forward propagation of the source wavefield, the backward propagation of the receiver wavefield, and the associated imaging condition between the two computed wavefields. In some cases, source wavefield and receiver wavefield can be referred to as forward wavefield and backward wavefield, respectively.

Using the two-way wave equation, RTM can generate images of the complex subsurface structure (for example, subsalt), focus the steeply dipping events (for example, salt flank area) and provide more accurate image amplitudes for seismic interpretation. Therefore, RTM CAGs can be used in the migration velocity analysis instead of one-way wave equation migration, Kirchhoff, or beam migration methods. Cost effective methods for making CAGs based on the advanced RTM technology will be useful for improving the efficiency of the subsurface analysis.

In some cases, the RTM with virtual source imaging condition of a common shot gather can be constructed by the cross-correlation between forward wavefield S and backward wavefield R traveling backwards as follows:

$$m_{rtm}(x;x_s) = \int_0^{T_{max}} S(x,t;x_s) \cdot R(x,t;x_s) dt, \quad (1)$$

where $x_s$ represents source locations, t represents each sampling time step, and $T_{max}$ represents the total recording time, and the S and R wavefields are defined as follows:

$$S(x,t) = -\partial^2 u_s(x,t;x_s)/\partial t^2, R(x,t) = u_r(x,t;x_s). \quad (2)$$

Here, the source wavefield $u_s$ and receiver wavefield $u_r$ can be calculated by using acoustic wave equation as follows:

$$\frac{1}{c_0^2(x)} \frac{\partial u_s^2(x,t;x_s)}{\partial t^2} - \nabla^2 u_s(x,t;x_s) = f(t;x_s) \quad \text{and} \quad (3)$$

$$\frac{1}{c_0^2(x)} \frac{\partial u_r^2(x,t;x_s)}{\partial t^2} - \nabla^2 u_r(x,t;x_s) = d(x_r,t;x_s) \quad (4)$$

where $c_0(x)$ is the background velocity, $f$ is the source function, t represents the time step, and $d(x_r,t;x_s)$ represents scattered seismic data, which may be defined as the common shot gather without direct waves. The source wavefield $u_s$ can also be referred to as the zero-order Born data. The calculation of the zero-order Born data in equation (3) can be referred to as zero-order Born modeling, and the left side of equation (3) can be referred to as the Green's function.

By using the zero-order Born data calculated in Equation 3, the first-order Born data $\delta u_s$, which may also be referred to as wavefield perturbation or synthetic reflection data, can be calculated by $$\frac{1}{c_0^2(x)} \frac{\partial \delta u_s^2(x,t;x_s)}{\partial t^2} - \nabla^2 \delta u_s(x,t;x_s) = \frac{1}{c_0^3(x)} m(x) \frac{\partial u_s^2(x,t;x_s)}{\partial t^2} \quad (5)$$

where the reflectivity model m(x) is expressed as follows:

$$m(x) = \frac{2\delta c(x)}{c_0(x)} \quad (6)$$

where $\delta c(x)$ is the velocity perturbation defined as the misfit between true velocity and the background velocity.

The RTM imaging condition in Equation 1 can be rewritten by using the migration operator $L^T$ as follows:

$$m_{rtm} = L^T d \quad (7)$$

where $m_{rtm}$ is the reflectivity model, T is the adjoint operator, d is the scattered seismic data and L represents the linearized Born forward modeling, which can be achieved by applying the Born approximation d=Lm to the acoustic wave equation.

The Born modeling Lm can be also referred to as de-migration. If the background velocity model used in the RTM is smooth and close to the true velocity model, then the RTM algorithm may yield the correct reflectivity model computed by the Born approximation as expressed in Equations 3 and 5. Synthesized seismic data derived from this reflectivity model would have been equivalent to the observed seismic data without direct waves at the receiver locations. However, because of the noises in the seismic data and the complexity of subsurface structure, RTM algorithms would not recover the true reflectivity model even if the background velocity is close to the true one.

In some implementations, Least Squares Reverse Time Migration (LSRTM) can be used for obtaining high resolution broadband seismic images. Thus, LSRTM can improve the quantitative seismic interpretation. LSRTM enhances conventional migration images by performing iterative least squares inversion in order to compensate for irregular wavefield illumination, attenuate migration artefacts, increase spatial resolution and reduce side lobes of seismic wavelets.

LSRTM is an inversion process which provides an estimation of the reflectivity model m by minimizing the misfit between the de-migration result and the reflection data. The objective function for LSRTM can be defined as:

$$E(m) = \frac{1}{2}\|Lm-d\|^2. \quad (8)$$

where $\|\ \|^2$ represents a L2-norm objective function.

The objective function can be rewritten by using the synthetic first-order Born data and the observed reflection data as follows:

$$E(m)=-\frac{1}{2}\|\delta u_s(x_r,t;x_s)-d(x_r,t;x_s)\|^2 \frac{1}{2}\|r(x_r,t;x_s)\|^2 \quad (9)$$

where $r(x_r,t;x_s)$ represents the residual data at receiver locations.

The gradient of the objective function $E(m)$ can be estimated by taking the partial derivative of the objective function with respect to the reflectivity model as follows:

$$g = \frac{\partial E}{\partial m} = \int \frac{\partial \delta u_s(t)}{\partial m} r(t) dt = \left[\frac{\partial \delta u_s}{\partial m}\right]^T R \quad (10)$$

where $R=\delta u_s-d$.

In some cases, the backpropagation technique can be used to compute the gradient vector. Accordingly, Equation 10 can be rewritten as follows:

$$g=\int_0^{Tmax} \partial^2 u_s(x,t;x_s)/\partial t^2 \cdot u_{res}(x,t;x_s)dt \quad (11)$$

where the backward (receiver) propagated residual $u_{res}$ is calculated by:

$$\frac{1}{c_0^2(x)}\frac{\partial u_{res}^2(x,t;x_s)}{\partial t^2} - \nabla^2 u_{res}(x,t;x_s) = t(x_r,t;x_s). \quad (12)$$

If the first-order Born data on receiver locations are zeros, the gradient vector for LSRTM in Equation 11 is same as RTM with virtual source imaging condition according to Equation 1. Therefore, if we start LSRTM with the zero reflectivity model, the result at the first iteration will be equivalent to an RTM result.

As in the case of full waveform inversion, the LSRTM algorithm can also use the inverse of Hessian matrix, which includes second-order derivatives of the objective function with respect to the model parameter. However, due to computational cost, the numerical calculation of the Hessian is may be too complex and time consuming, in particular for 3D applications. In some cases, the Preconditioned Conjugate Gradient (PCG) technique can be used instead. As a preconditioner in the PCG formulation, the source side illumination characteristics generated by the source wavefield can be used to speed up convergence. The preconditioned gradient vector Pg with the source illumination can be expressed as:

$$Pg = \frac{\int_0^{Tmax} \partial^2 u_s(x,t;x_s)/\partial t^2 \cdot u_{res}(x,t;x_s)dt}{\int_0^{Tmax}(\partial^2 u_s(x,t;x_s)/\partial t^2)^2 dt}. \quad (13)$$

However, like the traditional RTM algorithm, LSRTM also suffers from wavenumber backscattered noise, especially in the early iterations. As such, a post processing step, such as Laplacian filtering, may be used to improve the contribution by primary reflections. However, this post processing filtering may create high frequency noise, and thus contaminate the migration images more than low frequency artefacts. In addition, parameters for a low-cut filter may be chosen manually, and thus not suitable for iterative algorithms.

In some implementations, primary reflections can be extracted in LSRTM, for example at early iterations, to accelerate the convergence speed. The improved reflectivity models can be obtained by reducing the degree of freedom in the inversion process. In some cases, wavefield decomposition based on analytic wavefields can be used to extract primary reflections.

In some cases, wavefield decomposition can be conducted in the frequency-wavenumber (f-k) domain. However, f-k filtering may use intensive computational effort because the source and receiver wavefields may be restored at every imaging time step, and forward and inverse 2-dimensional (2D) Fourier Transforms may be applied on the two wavefields. Alternatively, wavefield decomposition can be performed using an analytic signal. The analytic signal can be obtained by Hilbert transform. Since the analytic signal has only positive frequency components, wavefield decomposition can be more efficiently performed by using a 1-dimensional (1D) Fourier transform only on the vertical axis. This approach can reduce disk input/output operations and Fourier Transform operations. In this approach, the forward modeling steps may be performed twice as much as conventional LSRTM, but the total computation complexity and computation time is smaller than conventional LSRTM because this approach provides a faster convergence rate.

The imaging condition in Equation 1 can be expressed using four different combinations of forward and backward wavefields in the vertical direction, as follows:

$$L^T d=m_{mig}(\vec{x})=\int_0^{Tmax}[S_D \cdot R_U+S_U \cdot R_D+S_D \cdot R_D+S_U \cdot R_U]dt. \quad (14)$$

where subscripts D and U represent down-going and up-going wavefields, respectively.

Here, the first term $S_D \cdot R_U$, including down-going source and up-going receiver fields, represents the true reflection; the second term $S_U \cdot R_D$, represents the model reflection in phase with the true reflection, and the other two terms represent low-frequency migration artefacts. In the LSRTM algorithm using analytic signal based wave decomposition, an approximate imaging condition based on one-way down-going source ($S_D$) and up-going receiver ($R_U$) wavefields is used during early iterations. The rest of the terms in the imaging condition of Equation 14 are, thus, excluded.

In contrast to the one-way wave equation solutions, RTM can image salt flanks and dips that cross the horizontal plane at angles larger than 70 degrees (°) because of its two-way wave equation forward and backward wavefield propagations. In addition, field seismic recorded data exhibit many types of multiples and multipath arrivals as well as primary reflections. Because of this reason, if LSRTM uses only one-way wavefields, the de-migration results with the obtained reflectivity model may not recover fully the observed data, and the inversion process during LSRTM may not converge to a global minimum. Therefore, while the one-way $S_D$ and $R_U$ wavefields can be used during early iterations to obtain a refined reflectivity model. Conventional LSRTM based on two-way wave equations can be used to obtain the final reflectivity model based on the refined reflectivity model. In some implementations, the forward and backward wavefield decomposition can act as a regularization factor or as preconditioner during the various iterations. Switching from one-way to two-way wave propagators during LSRTM iterations can be determined according to the misfit error of the objective function. FIGS. 1-9 and associated descriptions provide additional details of these implementations.

Using the decomposed wavefields in the LSRTM process can provide one or more advantages. For example, the reflectivity model can be converged faster, and thus save computing time and resources. Additionally, a more accurate reflectivity model can be obtained, and thus provide better understanding of the substructure surfaces, including for example, whether there is a potential trap, structure, or a combination thereof for hydrocarbon accumulation. These understandings can be used as a guide for drilling engineers to optimally place and locate their well trajectories to the prospective hydrocarbon reservoir.

FIG. 1 illustrates an example reflectivity model generating process 100 of LSRTM using the analytic signal based wavefield decomposition algorithm, according to an implementation. For clarity of presentation, the description that follows generally describes process 100 in the context of FIGS. 2A-9. However, it will be understood that process 100 may be performed, for example, by any other suitable system, environment, software, and hardware, or a combination of systems, environments, software, and hardware, as appropriate. In some cases, the process 100 can be executed on large scale computer clusters, super computers, or any other computing device or collection of computing devices. In some implementations, various steps of process 100 can be run in parallel, in combination, in loops, or in any order.

At 102, forward time-domain propagation modeling is performed on the source signal data. The source signal data includes sample data of the source signal, that is transmitted into the subsurface of a geographic area by a source device. In some cases, source signal data are recordings of the source wavelets generated by the source device. Alternatively or in combination, source signal data can be computer-generated source excitation using mathematical functions, for example, Ricker wavelet functions, or other simulations and approximations of the source signal. During a forward time-domain propagation modeling process, a plurality of source wavefields from the source location to a receiver location are calculated using the source signal data and the background velocity. Each source wavefield that corresponds to a particular time step and a particular location between the source location and the receiver location, can be calculated. The source wavefield that corresponds to the receiver location can be referred to as modeled receiver data.

As illustrated, the forward modeling can be performed using a zero order Born modeling, discussed previously in Equation (3), where the source signal data is used as $f(t;x_s)$, and $u_s(x,t;x_s)$ represents source wavefield in time domain.

At 104, as illustrated, a Hilbert transform function is performed on the source signal data to generate the Hilbert transformed source signal data. At 106, the forward modeling is performed with the Hilbert transformed source signal data. As illustrated, the same zero order Born modeling, discussed previously in Equation (3), can be used, where the Hilbert transformed source signal data $\mathcal{H}[f(t;x_s)]$ is used instead of the source signal data $f(t;x_s)$.

The outputs of 102 and 106 are summed to generate the source analytic signal. In the context of the digital signal processing, an analytic signal is a complex-valued signal. Here, the source analytic signal is composed from source wavefield, obtained by forward modeling of the source signal, and the source wavefield, obtained by the forward modeling of the Hilbert transformed signal data as real and imaginary parts, respectively. Equation (15) represents the source analytic signal, which can also be referred to as the analytic source wavefields:

$$\overline{U_S}(t,x,y,z)=U_S(t,x,y,z)+j\mathcal{H}[U_S(t,x,y,z)], \quad (15)$$

where $\mathcal{H}[U_S(t,x,y,z)]$ defines the Hilbert transform of source wavefield $U_S$, j is the imaginary number $\sqrt{-1}$, x, y, z each represents one axis of the 3-dimensional (3D) coordinates, with x and y representing the axis on the horizontal plane and z representing the vertical axis.

At 108, the analytic source wavefields are decomposed into up-going and down-going components. In some implementations, because the positive frequency component is considered in the analytic wavefields, the analytic wavefields can be decomposed by taking a one-dimensional Fourier transform of the analytic wavefields along the z dimension based on the sign of the wave number of z. For example, an analytic signal $U_a(t,x,y,z)$ including the real part and the Hilbert transformed imaginary part can be expressed in Equation (16):

$$U_a(t,x,y,z)=U(t,x,y,z)+j\mathcal{H}[U(t,x,y,z)], \quad (16)$$

Equation (16) can be separated into up-going and down-going wavefields with the Fourier transform along the z dimension, as shown in the equation (17):

$$\tilde{U}_a(t, x, y, k_z) = \begin{cases} U_+(t, x, y, k_z), k_z \geq 0 \\ U_-(t, x, y, k_z), k_z < 0 \end{cases}, \quad (17)$$

where the subscripts "+" and "−" denote down and up going wavefields, respectively. This approach may introduce computation overhead because the Hilbert transform uses a Fourier transform with its shifting phase component at ±900.

For an efficient application of equations (1) and (2), the analytic wavefield can be constructed by taking advantage of the intrinsic characteristic of the Hilbert transform, as shown in the equation (18):

$$\mathcal{H}(u*v)=\mathcal{H}(u)*v=u*\mathcal{H}(v). \quad (18)$$

As discussed previously, Green's function can be used in the forward and background propagation modeling. When the forward and backward propagated wavefields are computed, each wavefield can be described by:

$$U_f(t,x,y,z)=G*s(t,x,y,z) \quad (19) \text{ and}$$

$$U_b(t,x,y,z)=G*d(t,x,y,z), \quad (20)$$

where the subscripts f and b denote forward and backward propagation, respectively, G denotes the Green's function, s(t,x,y,z) represents the source signal data and d(t,x,y,z) represents the residual data calculated previously. The calculation of the residual data and backward propagation modeling will be discussed in more detail in the steps of 114 and 120-126.

By equation (18), the Hilbert transform of equations (19) and (20) are equivalent to the convolution of the Hilbert transformed source function or recorded data with the Green's function, as follows:

$$\mathcal{H}[U_f(t,x,y,z)]=G*\mathcal{H}[s(t,x,y,z)] \quad (21) \text{ and}$$

$$\mathcal{H}[U_b(t,x,y,z)]=G*\mathcal{H}[d(t,x,y,z)]. \quad (22)$$

Therefore, the source analytic wavefields and residual analytic wavefields can obtained using equations (16), (21), and (22); and thus the equation (17) can be used to decompose the source analytic wavefields and residual analytic wavefields efficiently. By using the intrinsic characteristic of the Hilbert transform, the same Green's function G (instead of Hilbert transformed Green's function H[G]) can be used in the calculation of both the real and the imaginary part of the analytic wavefield. In addition, by taking a one-dimensional Fourier transform of the analytic wavefield along only the z direction, the wavefield can be separated into up- and down-going components based on the sign of the wave number of z. The down-going wavefield can be obtained by taking an inverse Fourier transform. Therefore, the wavefield decomposition can be carried out without multi-dimensional Fourier transform.

At 134, the source illumination factor is calculated based on the down-going components of the analytic source wavefields. The source illumination factor F can be expressed as follows:

$$F = \int_0^{Tmax} (\partial^2 u_s(x,t;x_s)/\partial t^2)^2 dt \qquad (23)$$

In some implementations, backward propagation can be performed based on residual data. In some cases, residual data can also be referred to as residual vectors. The residual data is calculated based on the differences between synthetic reflection data and observed reflection data.

At 112, a first order Born modeling is performed to generate the first-order Born data, also referred to as the wavefield perturbation or the synthetic reflection data. As illustrated, the source wavefields generated at 102, and a reflectivity model are used as inputs to the first order Born modeling. In some implementations, the first order Born modeling can be performed using equation (5) discussed previously. In the first iteration, an initial reflectivity model can be used as m(x). In one example, the initial reflectivity model can be obtained through an RTM process.

At 114, the residual vector is calculated based on synthetic reflection data and the observed reflection data.

In some cases, the received signal data can include time-domain samples of receiver signal data that are received by a receiver device at the receiver location. For example, during seismic acquisition, a source (dynamite, vibratory truck, air gun array) is activated and the reflections/refractions/transmissions from the subsurface geological boundaries are recorded by the receiver devices which are located on the surface of the Earth. This type of acquisition is repeated for each shot, sequentially or simultaneously, until all the seismic data have been acquired for this survey area. These acquired seismic data are referred to as the receiver signal data. In some cases, the acquired seismic data are collected in the field, transferred to an office (stored and transported via a computer network, a physical network, or a combination thereof), and used as inputs to a computing device executing the process 100. The observed reflection data can be obtained by processing the receiver signal data. Examples of the processing includes applying muting before the first reflection to remove direct waves; and selecting small offset of the data from the source location to exclude refracted waves.

In some implementations, the residual data can be obtained using the objective function described previously in equation (9). In some cases, the synthetic reflection data can be scaled before the application of the objective function. In some implementations, a shaping filter can be constructed based on the observed reflection data. The shaping filter can then be convolved with the synthetic reflection data generated at 112 to generate the scaled synthetic reflection data at each iteration. As discussed previously, L2-norm objective function is used to minimize the misfits. If there is a big difference between observed and synthetic data, the convergence speed may be slow. Using the scaled synthetic data can increase the convergence speed. In addition, the shaping filter can match the phase of synthetic data with that of observed data, which helps the converging process.

At steps 122-128, backward propagation modeling is performed with the residual data. Similarly to the forward propagation modeling discussed previously in steps 102-108, the analytic residual wavefields are generated and decomposed using the residual data and the Hilbert transformed residual data. At 122, the backward modeling can be performed on the residual data using the zero order Born modeling, discussed previously in Equation (4), where the residual data is used as $d(x_r,t;x_s)$, and $u_r(x,t;x_s)$ represents the residual wavefield.

At 124, a Hilbert transform function is performed on the residual data to generate the Hilbert transformed residual data. At 126, the backward propagation modeling is performed on the Hilbert transformed residual data. As illustrated, the same zero order Born modeling, discussed previously in Equation (4), can be used. Instead of using the residual data as $d(x_r,t;x_s)$, the Hilbert transformed residual data is used as $d(x_r,t;x_s)$.

At 128, the analytic residual wavefields are decomposed into up-going and down-going components.

At 132, the gradient vector is calculated based on the up-going components of the analytic residual wavefields and the down-going analytic source wavefields. In some implementations, the gradient factor can be calculated using partial derivatives of the objective function with respect to the reflectivity model, as discussed in equations (10), (11), and (12), where the up-going components of the analytic residual wavefields are used as $u_{res}(x,t;x_s)$, and the down-going components of the analytic source wavefields are used as $u_s(x,t;x_s)$, in the objective function.

At 136, the preconditioned gradient vector is calculated based on the source illumination factor generated at 134 and the gradient vector generated at 132. In some implementations, equation (13) discussed previously can be used to generate the gradient vector.

At 138, the reflectivity model is updated using the preconditioned conjugate gradient vector. In some cases, preconditioned conjugate gradient numerical schemes such as the Nocedal and Wright scheme can be used to update the reflectivity model. Followings are example calculations of updating the reflectivity model using the Nocedal and Wright scheme:

$$g^{(k+1)} = L^T[Lm^{(k)} - d] \qquad (24a)$$

$$\beta = \frac{[g^{(k+1)}]^T P g^{(k+1)}}{[g^{(k)}]^T P g^{(k)}} \qquad (24b)$$

$$z^{(k+1)} = -P g^{(k+1)} + \beta z^{(k)} \qquad (24c)$$

$$\alpha = \frac{[z^{(k+1)}]^T g^{(k+1)}}{[L z^{(k+1)}]^T L z^{(k+1)}} \qquad (24d)$$

$$m^{(k+1)} = m^{(k)} + \alpha z^{(k+1)} \qquad (24e)$$

where k represents the k-th iteration, and accordingly, $m^{(k)}$ and $m^{(k+1)}$ represent the reflectivity models at the k-th and k+1-th iteration, respectively. $g^{(k)}$ and $g^{(k+1)}$ represent the gradient vector at the k-th and k+1-th iteration, respectively, P represents the preconditioner, and $z^{(k)}$ and $z^{(k+1)}$ represent the preconditioned conjugate gradient vector at the k-th and k+1-th iteration, respectively. L represents the born modelling operator and d represents the observed reflection data.

The process 100 can performed in an iteration loop. An initial reflectivity model is used in the first iteration. After the initial reflectivity model is updated, the updated reflectivity model is used as an input to the step 112 to generate the next synthetic reflection data for the second iteration. In some implementations, after each iteration, the misfit error of the objective functions is determined based on the magnitude of the residual vector. If the misfit error of the current iteration is smaller than the that of the previous iteration, the iteration process continues. If the misfit error of the current iteration is larger than or equal to that of the previous iteration. the iteration process stops. Alternatively or in combination, a threshold number of iterations can be configured and the iteration process can stop if the threshold number of iterations is reached.

In some cases, after the refined reflectivity model is determined to be obtained, process 100 can continue using a two-way process. In the two-way process, the steps of Hilbert transform, propagation modelling on the Hilbert transformed signal, and decomposing, are skipped. Therefore, both the down-going and up-going components of the source wavefields and the residual wavefields are used in the LSRTM calculations. The two-way process can repeat in one or more iterations until it converges. The convergence can be determined based on the misfit error determined at each iteration. For example, the iteration process can stop if the misfit error of the current iteration is larger than or equal to that of the previous iteration. Alternatively or in combination, a threshold number of iterations can be configured and the iteration process can stop if the threshold number of iterations is reached.

FIG. 2A illustrates an example image 202 representing a modified Marmousi model, according to an implementation. The Marmousi model is a complex 2D structural model that can be used to compare depth-migration and velocity model determination processes. The 4 m-grid modified Marmousi model is generated by adding a water layer of 200 m on the top of the original Marmousi model. The Marmousi model can be simulated using commercial software. A Ricker wavelet is used as a source wavelet with the peak frequency of 20 Hertz (Hz). The total recording time is 3.2 seconds and the sampling rate is 4 milliseconds (ms). Source and receiver intervals are 16 m and 8 m, respectively, and the total number of shots is 574. The minimum and maximum offsets are 0 meter (m) and 2000 m, respectively. Furthermore, the direct arrivals are removed by muting the receiver signal before the first reflections.

FIG. 2B illustrates an example image 204 representing a smoothed Marmousi model, according to an implementation. The smoothed model is used to implement the RTM and the LSRTM as the background model. For migrations, the grid size of 4 m is used in the all directions and the true source wavelet is assumed to be unknown. Accordingly, a shape filter is generated to scale, then modeled with the observed data at the beginning of the LSRTM. The resultant images obtained by the RTM, conventional LSRTM, and the analytic signal based wavefield decomposition LSRTM are discussed in process 100. In the analytic signal based wavefield decomposition LSRTM process, the down-going source wavefields from the forward propagation and the up-going residual wavefield from the backward propagation are used in the first three iterations to obtain the refined reflectivity model. Subsequently, the two-way LSRTM process is used without decompositions, where the refined reflectivity model is used as the initial reflectivity model.

Figure 3:
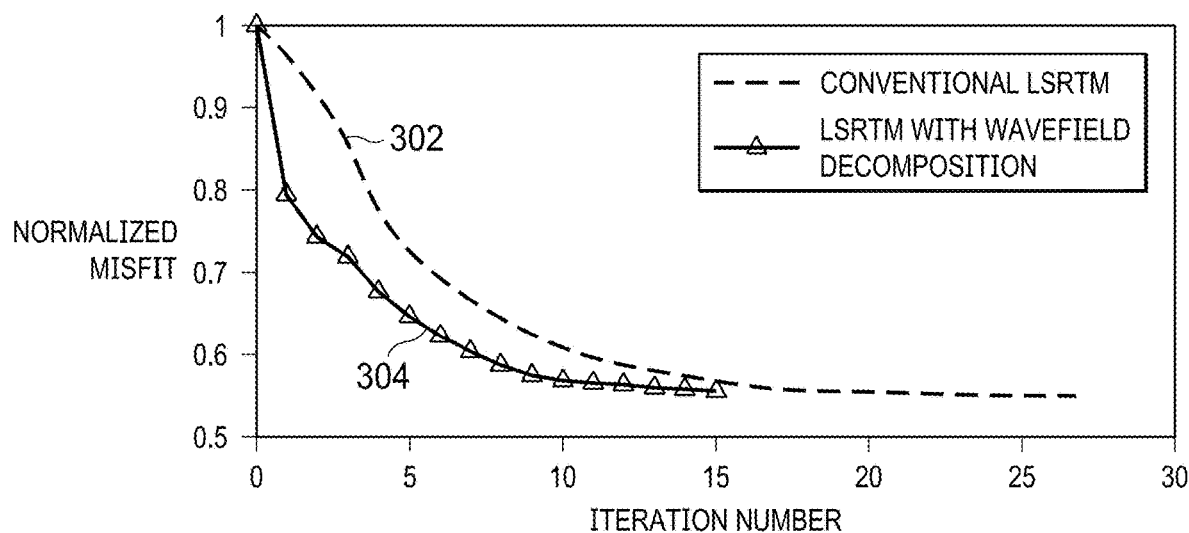
FIG. 3 is a chart illustrating example misfit curves, according to an implementation.

FIG. 3 is a chart 300 illustrating example misfit curves, according to an implementation. The chart 300 includes a misfit curve 302 obtained based on the conventional two-way LSRTM process, and a misfit curve 304 obtained based on the analytic signal based wavefield decomposition LSRTM process described previously. In the analytic signal based wavefield decomposition LSRTM process, the down-going source wavefields from the forward propagation and the up-going residual wavefield from the backward propagation are used in the first three iterations to obtain the refined reflectivity model. Subsequently, the conventional two-way LSRTM process is used, where the refined reflectivity model is used as the initial model. As illustrated, by using the down-going source wavefields and the up-going residual wavefields as pre-conditioners, the analytic signal based wavefield decomposition LSRTM process converges faster than the conventional LSRTM.

Figure 4A:
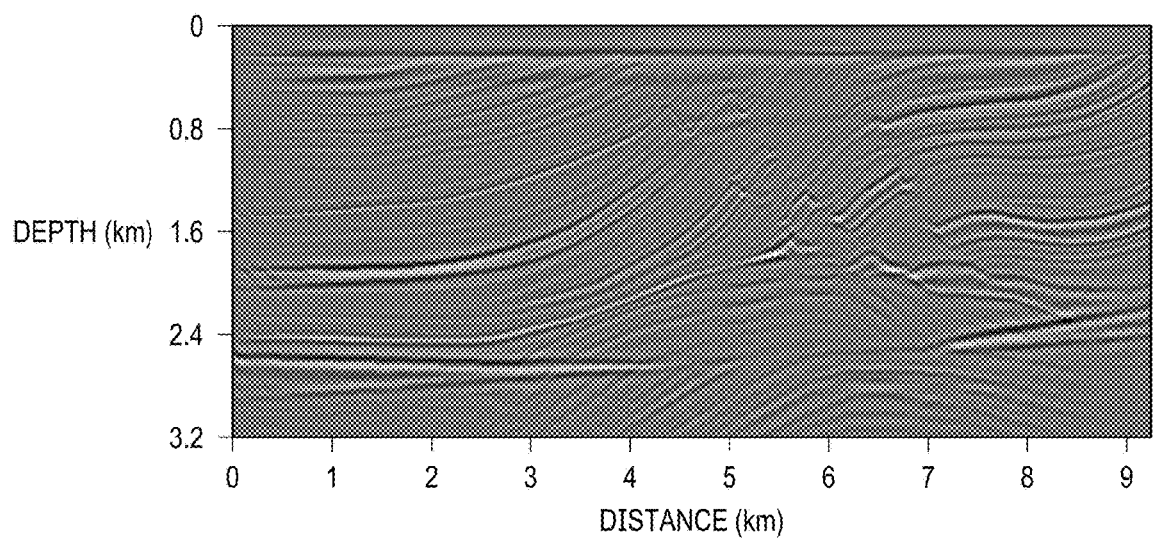
FIGS. 4A, 4B, 4C, 4D, and 4E illustrate example images of reflectivity models obtained by different migration algorithms, according to respective implementations.
Figure 4B:
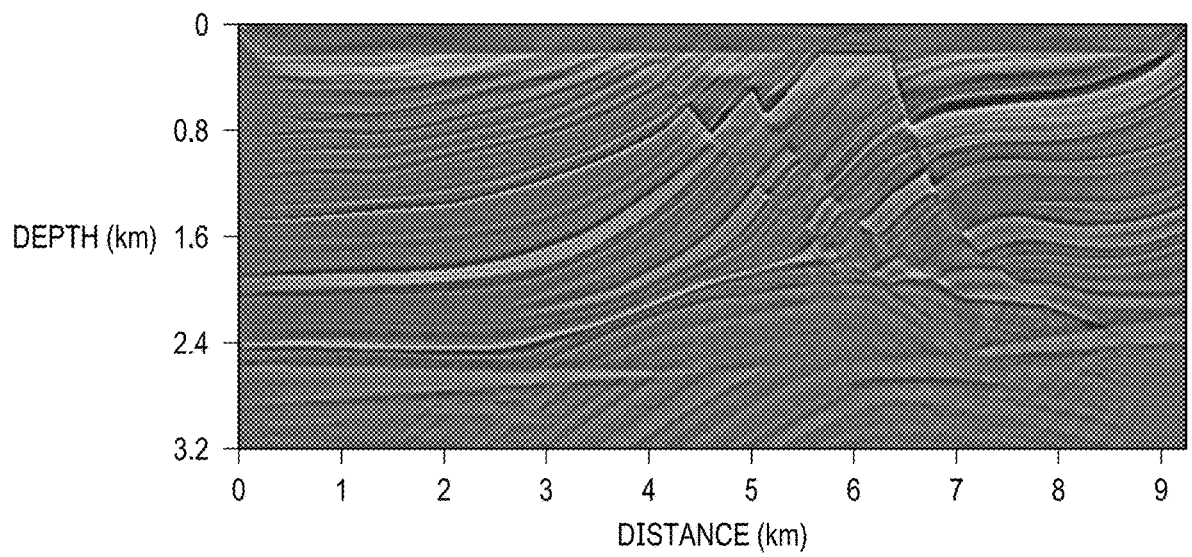

FIGS. 4A, 4B, 4C, 4D, and 4E illustrate example images of reflectivity models obtained by different migration algorithms, according to respective implementations. The x-axis represents horizontal distances from 0 to 9 kilometer (km), and the y-axis represents depths from 0 to 3.2 km. FIG. 4A is an image 402 representing a reflectivity model obtained by de-primary RTM process at the $25^{th}$ iteration, according to an implementation. These images can be generated using commercial software, for example, MATLAB, based on the reflectivity model data. FIG. 4B is an image 404 representing a reflectivity model obtained by the conventional LSRTM process at the $25^{th}$ iteration, where the RTM result shown in FIG. 4A is used as the initial reflectivity model, according to an implementation. Image 404 shows higher fidelity and resolution compared to image 404, and thus indicates that the LSRTM image is closer to the true reflectivity model than the RTM image.

Figure 4C:
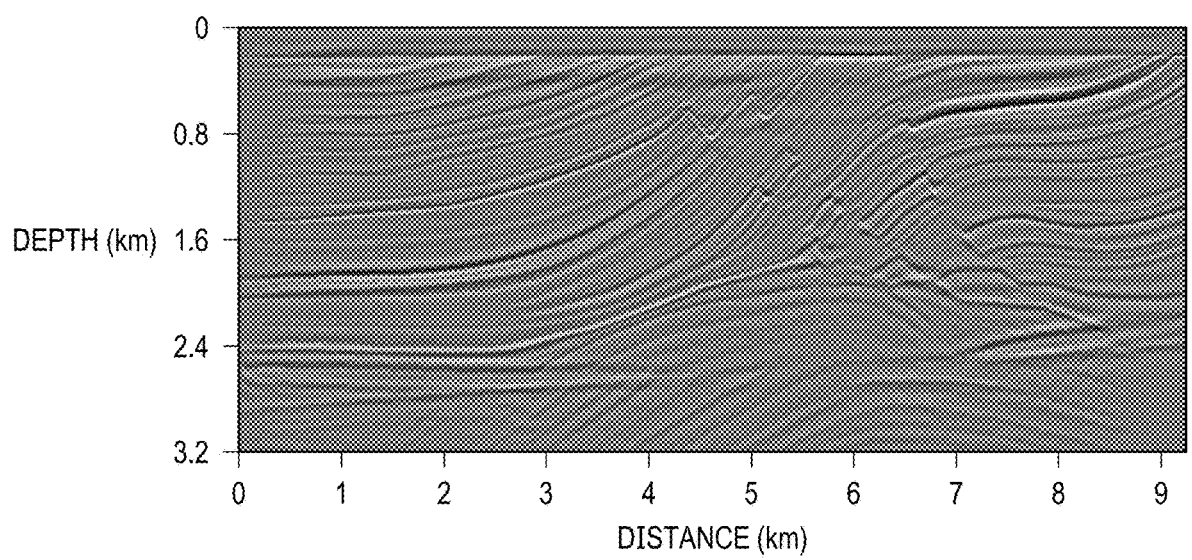
Figure 4D:
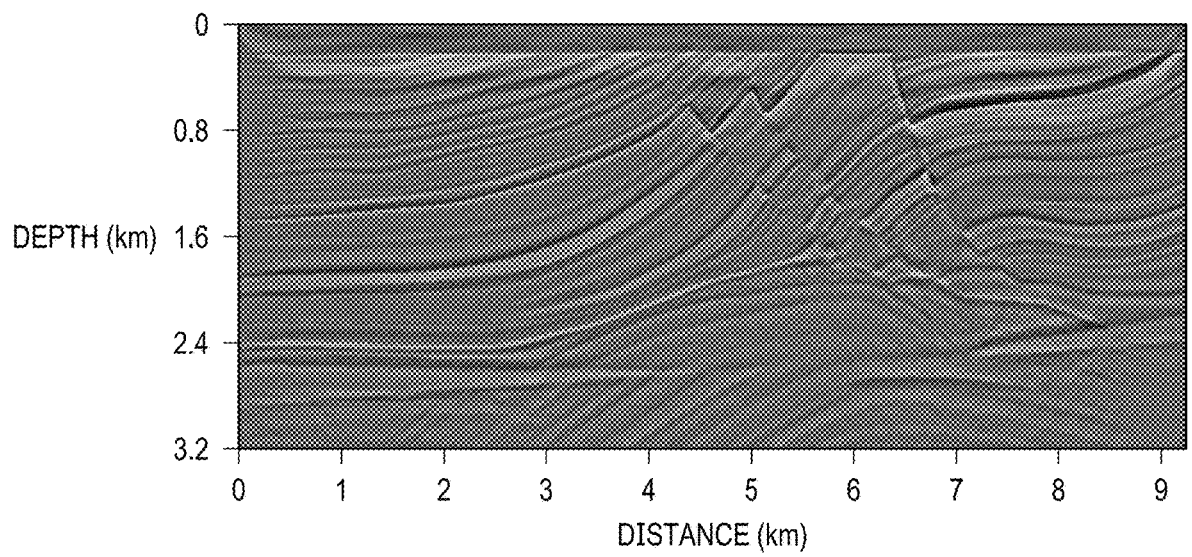
Figure 4E:
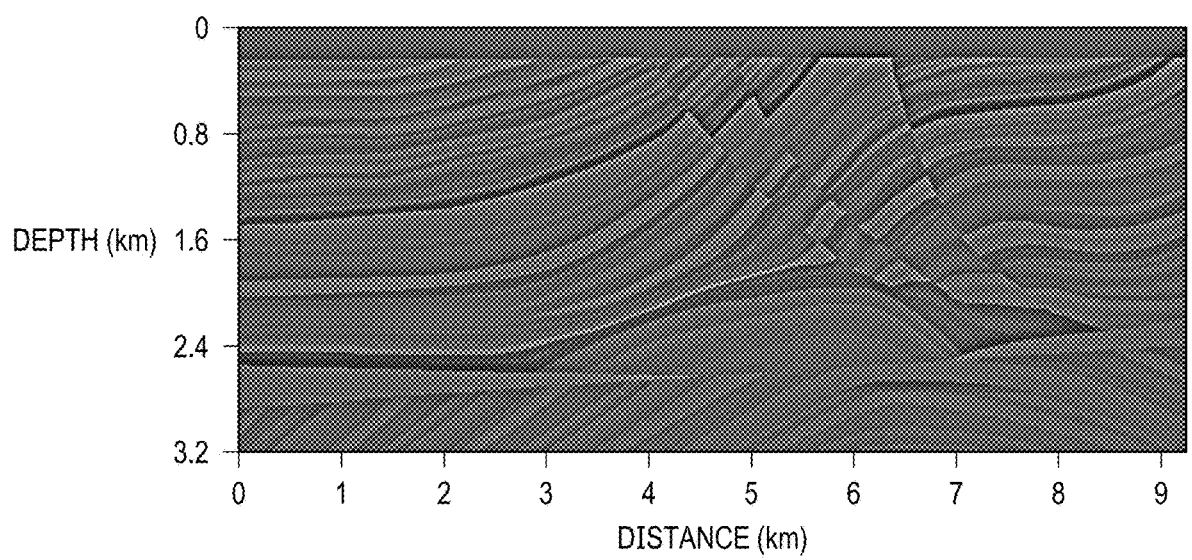

FIG. 4C is an image 406 representing a reflectivity model obtained by the analytic signal based wavefield decomposition LSRTM process at the $3^{rd}$ iteration, according to an implementation. FIG. 4D is an image 408 representing a reflectivity model obtained by the conventional LSRTM at the $15^{th}$ iteration, where the reflectivity model shown in FIG. 4C is used as the initial reflectivity model, according to an implementation. FIG. 4E is an image 410 representing the true reflectivity model, according to an implementation. Compared to the reflectivity model shown in image 404, the reflectivity model shown in image 408 is a closer approximation to the true reflectivity model shown in image 410.

FIG. 5 illustrates example enlarged shallow parts of images of reflectivity models obtained by different migration algorithms, according to respective implementations. In particular, FIG. 5 includes images 502, 504, 506, and 508 that represent the enlarged shallow parts of the reflectivity models shown in images 402, 404, 408, and 410, respectively. Here, the reflectivity model shown in image 506 approximates closer to the true reflectivity model shown in image 508 than the ones in images 502 and 504.

Similarly, FIG. 6 illustrates example enlarged deep parts of the images of reflectivity models obtained by different migration algorithms, according to respective implementations. In particular, FIG. 6 includes images 602, 604, 606, and 608 that represent the enlarged deep parts of the reflectivity models shown in images 402, 404, 408, and 410, respectively. Here, the reflectivity model shown in image 606 approximates closer to the true reflectivity model shown in image 608 than the ones in images 602 and 604. In particular, the lens-shaped reservoir shown in image 608 is better recovered in image 606 than in 602 and 604.

Figure 7A:
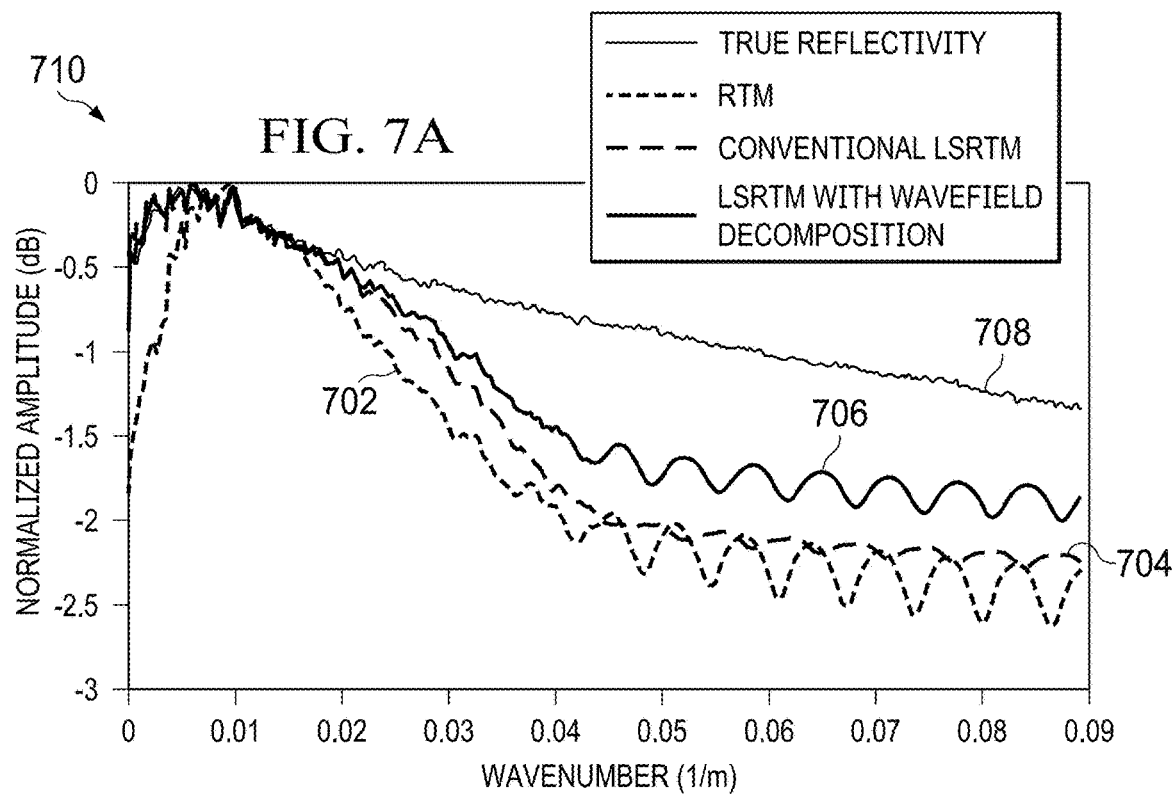
FIG. 7A is a chart illustrating example frequency spectra of the reflectivity models obtained by different migration algorithms, according to respective implementations.
Figure 7B:
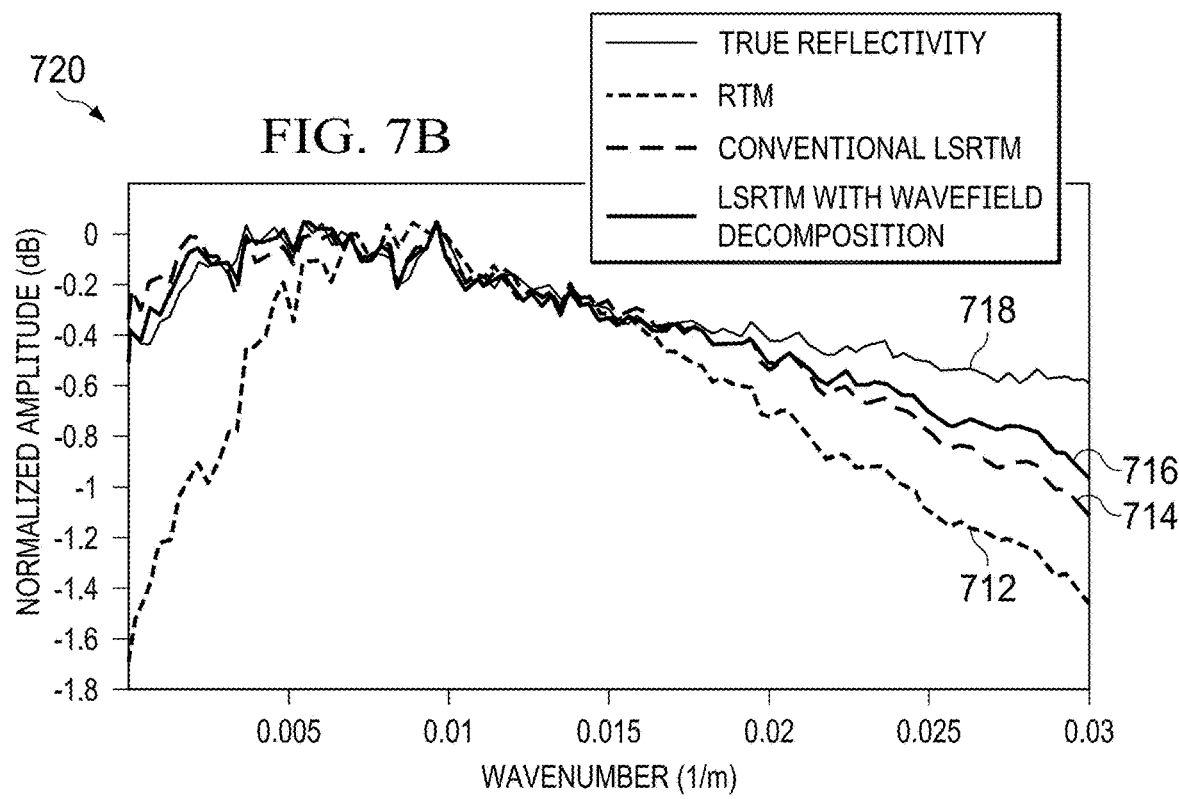
FIG. 7B is a chart illustrating example enlarged frequency spectra of the reflectivity models obtained by different migration algorithms, according to respective implementations.

FIG. 7A is a chart 710 illustrates example frequency spectra of the reflectivity models obtained by different migration algorithms, according to respective implementations. The chart 710 includes curves 702, 704, 706, and 708, which represent the frequency spectra of the reflectivity models obtained by the RM process, the conventional LSRTM process, the analytic signal based wavefield decomposition LSRTM process described previously, and the true reflectivity model, respectively. FIG. 7B is a chart 720 that illustrates example enlarged frequency spectra of the reflectivity models obtained by different migration algorithms, according to respective implementations. The chart 720 includes curves 712, 714, 716, and 718, which represent the enlarged frequency spectra of the curves 702, 704, 706, and 708 in the range of small wave numbers, respectively.

As shown in charts 710 and 720, while both LSRTM algorithms can provide a broadband image by extending the seismic spectra and recovering both low and high frequency information, the reflectivity model obtained by the analytic signal based wavefield decomposition LSRTM process is closer to the correct reflectivity model than the reflectivity model obtained by the conventional LSRTM process.

Figure 8:
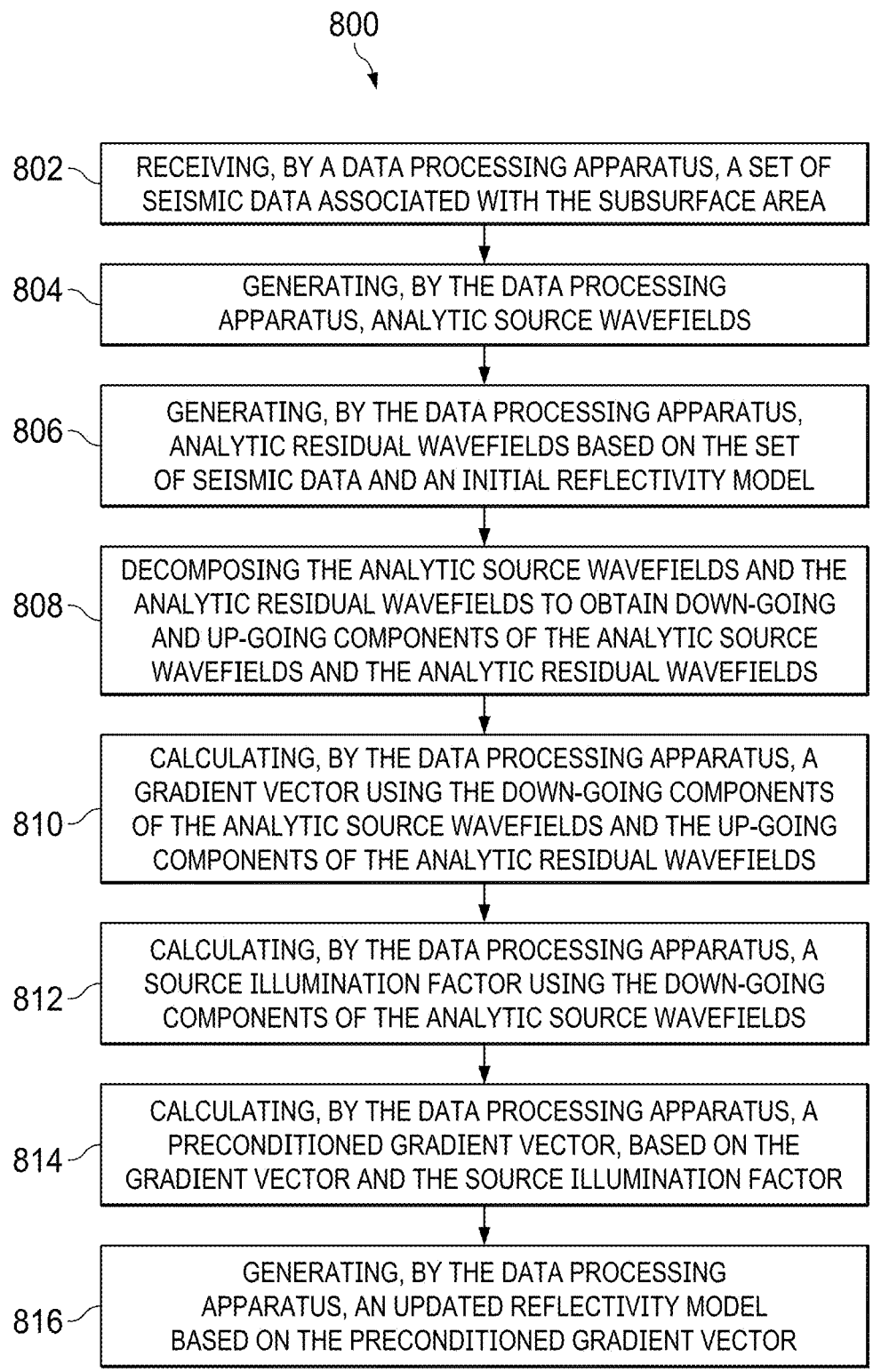
FIG. 8 illustrates an example reflectivity model generating method, according to an implementation.

FIG. 8 illustrates an example reflectivity model generating method 800, according to an implementation. For clarity of presentation, the description that follows generally describes method 800 in the context of FIGS. 1-7B and 9. However, it will be understood that method 800 may be performed, for example, by any other suitable system, environment, software, and hardware, or a combination of systems, environments, software, and hardware, as appropriate. In some cases, the method 800 can be executed on a computer cluster, super computers, or any other computing device or collection of computing devices. In some implementations, various steps of method 800 can be run in parallel, in combination, in loops, or in any order.

At 802, a set of seismic data associated with the subsurface area is received by a data processing apparatus.

At 804, the data processing apparatus generates analytic source wavefields.

At 806, the data processing apparatus generates analytic residual wavefields based on the set of seismic data and an initial reflectivity model.

At 808, the analytic source wavefields and the analytic residual wavefields are decomposed to obtain down-going and up-going components of the analytic source wavefields and the analytic residual wavefields.

At 810, the data processing apparatus calculates a gradient vector using the down-going components of the analytic source wavefields and the up-going components of the analytic residual wavefields.

At 812, the data processing apparatus calculates a source illumination factor using the down-going components of the analytic source wavefields.

At 814, the data processing apparatus calculates a preconditioned gradient vector, based on the gradient vector and the source illumination factor.

At 816, the data processing apparatus generates an updated reflectivity model based on the preconditioned gradient vector.

In some cases, the reflectivity model can be updated in each iteration of an iterative process, and a refined reflectivity model can be generated using the iterative process. In some cases, a final reflectivity model can be further generated using the refined reflectivity model and undecomposed wavefields. The finalized reflectivity model can be used to generate subsurface images. The subsurface images can be used to provide better understanding of the subsurface structure and improve the efficiency of a hydrocarbon exploration or production operation in the geographic area. For example, while results obtained from general migration methods can only be used to confirm the qualitative characteristic of geological structure, the LSRTM described in this disclosure provides quantitative recovery of reflectivity model for migrated common shot gathers. As one example, the near-angle stacked reflectivity can establish the impedance perturbation estimate whereas the far-angle reflectivity can be employed to estimate the velocity perturbation. Therefore, more accurate reflectivity estimate can be used to reduce the drilling risk and provide more credible target location.

Figure 9:
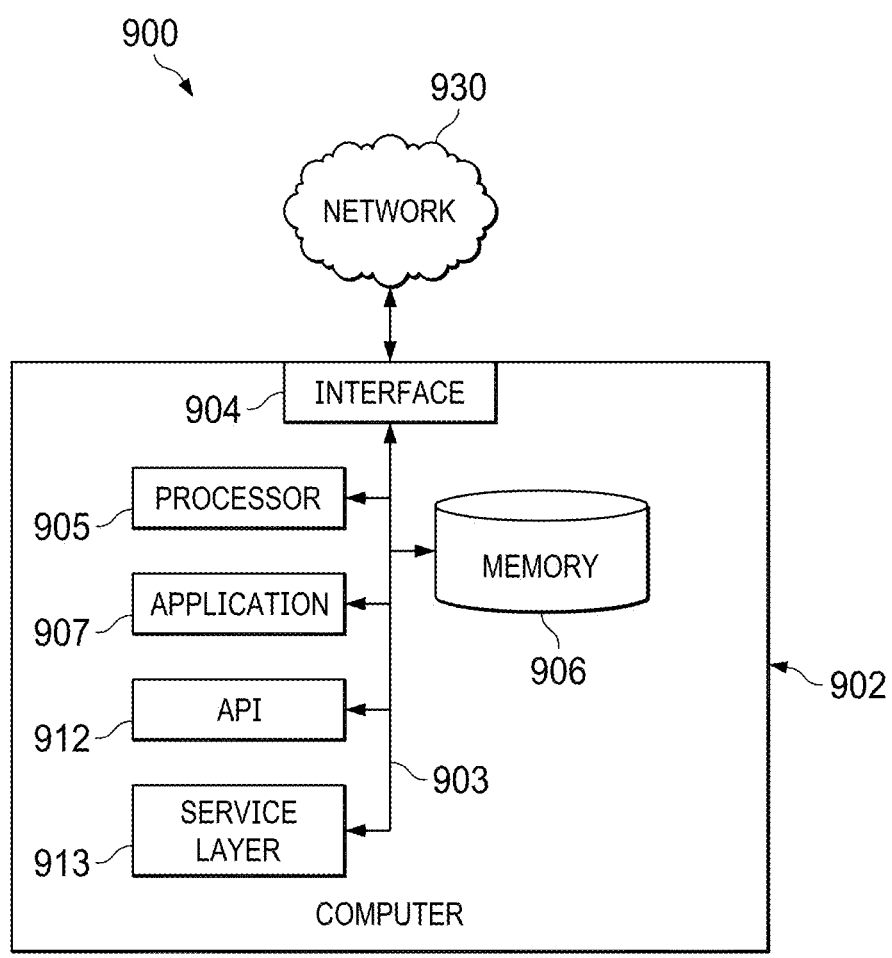
FIG. 9 is a high level architecture block diagram of a geophysical imaging system that generates a reflectivity model, according to an implementation.

FIG. 9 is a high level architecture block diagram of a geophysical imaging system 900 that generates a reflectivity model based on the methods described in this disclosure, according to an implementation. At a high level, the illustrated system 900 includes a computer 902 coupled with a network 930.

The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 930 facilitates communication between the computer 902 and other components, for example, components that obtain observed data for a location and transmit the observed data to the computer 902. The network 930 can be a wireless or a wireline network. The network 930 can also be a memory pipe, a hardware connection, or any internal or external communication paths between the components.

The computer 902 includes a computing system configured to perform the method as described in this disclosure. For example, the computer 902 can be used to implement the LSRTM processes illustrated in FIGS. 1 and 8. In some cases, the algorithm of the method can be implemented in an executable computing code, for example, C/C++ executable codes. In some cases, the computer 902 can include a standalone LINUX system that runs batch applications. In some cases, the computer 902 can include mobile or personal computers.

The computer 902 may comprise a computer that includes an input device, such as a keypad, keyboard, touch screen, microphone, speech recognition device, other devices that can accept user information, or an output device that conveys information associated with the operation of the computer 902, including digital data, visual or audio information, or a GUI.

The computer 902 can serve as a client, network component, a server, a database, or other persistency, or any other component of the system 900. In some implementations, one or more components of the computer 902 may be configured to operate within a cloud-computing-based environment.

At a high level, the computer 902 is an electronic computing device operable to receive, transmit, process, store, or manage data and information associated with the system 900. According to some implementations, the computer 902 may also include, or be communicably coupled with, an application server, e-mail server, web server, caching server, streaming data server, business intelligence (BI) server, or other server.

The computer 902 can receive requests over network 930 from a client application (for example, executing on another computer 902) and respond to the received requests by processing said requests in an appropriate software application. In addition, requests may also be sent to the computer 902 from internal users (for example, from a command console), external or third parties, or other automated applications.

Each of the components of the computer 902 can communicate using a system bus 903. In some implementations, any or all the components of the computer 902, both hardware or software, may interface with each other or the interface 904, over the system bus 903, using an application programming interface (API) 912 or a service layer 913. The API 912 may include specifications for routines, data structures, and object classes. The API 912 may be either computer language-independent or -dependent and refer to a complete interface, a single function, or even a set of APIs. The service layer 913 provides software services to the computer 902 or the system 900. The functionality of the computer 902 may be accessible for all service consumers using this service layer. Software services, such as those provided by the service layer 913, provide reusable, defined business functionalities, through a defined interface. For example, the interface may be software written in JAVA, C++, or suitable language providing data in Extensible Markup Language (XML) format. While illustrated as an integrated component of the computer 902, alternative implementations may illustrate the API 912 or the service layer 913 as stand-alone components in relation to other components of the computer 902 or system 900. Moreover, any or all parts of the API 912 or the service layer 913 may be implemented as sub-modules of another software module, enterprise application, or hardware module, without departing from the scope of this disclosure.

The computer 902 includes an interface 904. Although illustrated as a single interface 904 in FIG. 9, two or more interfaces 904 may be used according to particular needs, desires, or particular implementations of the computer 902 or system 900. The interface 904 is used by the computer 902 for communicating with other systems in a distributed environment—including within the system 900—connected to the network 930 (whether illustrated or not). Generally, the interface 904 comprises logic encoded in software or hardware in a suitable combination and operable to communicate with the network 930. More specifically, the interface 904 may comprise software supporting one or more communication protocols associated with communications such that the network 930 or interface's hardware is operable to communicate physical signals within and outside of the illustrated system 900.

The computer 902 includes a processor 905. Although illustrated as a single processor 905 in FIG. 9, two or more processors may be used according to particular needs, desires, or particular implementations of the computer 902 or the system 900. Generally, the processor 905 executes instructions and manipulates data to perform the operations of the computer 902. Specifically, the processor 905 executes the functionality required for processing geophysical data.

The computer 902 also includes a memory 906 that holds data for the computer 902 or other components of the system 900. Although illustrated as a single memory 906 in FIG. 9, two or more memories may be used according to particular needs, desires, or particular implementations of the computer 902 or the system 900. While memory 906 is illustrated as an integral component of the computer 902, in alternative implementations, memory 906 can be external to the computer 902 or the system 900.

The application 907 is an algorithmic software engine providing functionality according to particular needs, desires, or particular implementations of the computer 902 or the system 900, particularly with respect to functionality required for processing geophysical data. For example, application 907 can serve as one or more components/ applications described in FIGS. 1-8. Further, although illustrated as a single application 907, the application 907 may be implemented as multiple applications 907, on the computer 902. In addition, although illustrated as integral to the computer 902, in alternative implementations, the application 907 can be external to the computer 902 or the system 900.

There may be any number of computers 902 associated with, or external to, the system 900 and communicating over network 930. Further, the terms "client," "user," and other appropriate terminology may be used interchangeably, as appropriate, without departing from the scope of this disclosure. Moreover, this disclosure contemplates that many users may use one computer 902, or that one user may use multiple computers 902.

Described implementations of the subject matter can include one or more features, alone or in combination.

For example, in a first implementation, a computer-implemented method for generating a reflectivity model for a subsurface area, One computer-implemented method for generating a reflectivity model for a subsurface area includes: receiving, by a data processing apparatus, a set of seismic data associated with the subsurface area; generating, by the data processing apparatus, analytic source wavefields; generating, by the data processing apparatus, analytic residual wavefields based on the set of seismic data and an initial reflectivity model; decomposing the analytic source wavefields and the analytic residual wavefields to obtain down-going and up-going components of the analytic source wavefields and the analytic residual wavefields; calculating, by the data processing apparatus, a gradient vector using the down-going components of the analytic source wavefields and the up-going components of the analytic residual wavefields; calculating, by the data processing apparatus, a source illumination factor using the down-going components of the analytic source wavefields; calculating, by the data processing apparatus, a preconditioned gradient vector, based on the gradient vector and the source illumination factor; and generating, by the data processing apparatus, an updated reflectivity model based on the preconditioned gradient vector.

The foregoing and other implementations can each, optionally, include one or more of the following features, alone or in combination:

A first aspect, combinable with the general implementation, the method further comprising: using an iterative process to generate a refined reflectivity model, wherein the iterative process comprises a plurality of iterations, each of the plurality of iterations comprises generating the analytic source wavefields and the analytic residual wavefields, decomposing the analytic source wavefields and the analytic residual wavefields, and calculating the gradient vector, the source illumination factor, and the preconditioned gradient vector, and in each of the plurality of iterations, the initial reflectivity model is replaced by the updated reflectivity model generated in a previous iteration.

A second aspect, combinable with any of the previous or following aspects, the method further comprising: using the refined reflectivity model to generate a final reflectivity model using undecomposed source wavefields and undecomposed residual wavefields.

A third aspect, combinable with any of the previous or following aspects, wherein each of the plurality of iterations comprises: determining a misfit error of the respective iteration; and determining whether to stop the iteration process based on the misfit error.

A fourth aspect, combinable with any of the previous or following aspects, wherein the analytic source wavefields and the analytic residual wavefields are generated using Hilbert transformations.

A fifth aspect, combinable with any of the previous or following aspects, wherein generating the analytic residual wavefields comprises: generating synthetic reflection data based on source wavefields, background velocity, and the initial reflectivity model; generating residual data based on the synthetic reflection data and the set of seismic data; and generating the analytic residual wavefields based on the residual data.

A sixth aspect, combinable with any of the previous or following aspects, the method further comprising: scaling the synthetic reflection data; and wherein the residual data are generated based on the scaled synthetic reflection data.

In a second implementation, a non-transitory computer-readable medium storing instructions which, when executed, cause a computer system to perform operations comprising: receiving, by a data processing apparatus, a set of seismic data associated with the subsurface area; generating, by the data processing apparatus, analytic source wavefields; generating, by the data processing apparatus, analytic residual wavefields based on the set of seismic data and an initial reflectivity model; decomposing the analytic source wavefields and the analytic residual wavefields to obtain down-going and up-going components of the analytic source wavefields and the analytic residual wavefields; calculating, by the data processing apparatus, a gradient vector using the down-going components of the analytic source wavefields and the up-going components of the analytic residual wavefields; calculating, by the data processing apparatus, a source illumination factor using the down-going components of the analytic source wavefields; calculating, by the data processing apparatus, a preconditioned gradient vector, based on the gradient vector and the source illumination factor; and generating, by the data processing apparatus, an updated reflectivity model based on the preconditioned gradient vector.

The foregoing and other implementations can each, optionally, include one or more of the following features, alone or in combination:

A first aspect, combinable with the general implementation, the operations further comprising: using an iterative process to generate a refined reflectivity model, wherein the iterative process comprises a plurality of iterations, each of the plurality of iterations comprises generating the analytic source wavefields and the analytic residual wavefields, decomposing the analytic source wavefields and the analytic residual wavefields, and calculating the gradient vector, the source illumination factor, and the preconditioned gradient vector, and in each of the plurality of iterations, the initial reflectivity model is replaced by the updated reflectivity model generated in a previous iteration.

A second aspect, combinable with any of the previous or following aspects, the operations further comprising: using the refined reflectivity model to generate a final reflectivity model using undecomposed source wavefields and undecomposed residual wavefields.

A third aspect, combinable with any of the previous or following aspects, wherein each of the plurality of iterations comprises: determining a misfit error of the respective iteration; and determining whether to stop the iteration process based on the misfit error.

A fourth aspect, combinable with any of the previous or following aspects, wherein the analytic source wavefields and the analytic residual wavefields are generated using Hilbert transformations.

A fifth aspect, combinable with any of the previous or following aspects, wherein generating the analytic residual wavefields comprises: generating synthetic reflection data based on source wavefields, background velocity, and the initial reflectivity model; generating residual data based on the synthetic reflection data and the set of seismic data; and generating the analytic residual wavefields based on the residual data.

A sixth aspect, combinable with any of the previous or following aspects, the operations further comprising: scaling the synthetic reflection data; and wherein the residual data are generated based on the scaled synthetic reflection data.

In a third implementation, a device comprising: at least one hardware processor; and a non-transitory computer-readable storage medium coupled to the at least one hardware processor and storing programming instructions for execution by the at least one hardware processor, wherein the programming instructions, when executed, cause the at least one hardware processor to perform operations comprising: receiving a set of seismic data associated with a subsurface area; generating analytic source wavefields; generating analytic residual wavefields based on the set of seismic data and an initial reflectivity model; decomposing the analytic source wavefields and the analytic residual wavefields to obtain down-going and up-going components of the analytic source wavefields and the analytic residual wavefields; calculating a gradient vector using the down-going components of the analytic source wavefields and the up-going components of the analytic residual wavefields; calculating a source illumination factor using the down-going components of the analytic source wavefields; calculating a preconditioned gradient vector, based on the gradient vector and the source illumination factor; and generating an updated reflectivity model based on the preconditioned gradient vector.

The foregoing and other implementations can each, optionally, include one or more of the following features, alone or in combination:

A first aspect, combinable with the general implementation, the operations further comprising: using an iterative process to generate a refined reflectivity model, wherein the iterative process comprises a plurality of iterations, each of the plurality of iterations comprises generating the analytic source wavefields and the analytic residual wavefields, decomposing the analytic source wavefields and the analytic residual wavefields, and calculating the gradient vector, the source illumination factor, and the preconditioned gradient vector, and in each of the plurality of iterations, the initial reflectivity model is replaced by the updated reflectivity model generated in a previous iteration.

A second aspect, combinable with any of the previous or following aspects, the operations further comprising: using the refined reflectivity model to generate a final reflectivity model using undecomposed source wavefields and undecomposed residual wavefields.

A third aspect, combinable with any of the previous or following aspects, wherein each of the plurality of iterations comprises: determining a misfit error of the respective iteration; and determining whether to stop the iteration process based on the misfit error.

A fourth aspect, combinable with any of the previous or following aspects, wherein the analytic source wavefields and the analytic residual wavefields are generated using Hilbert transformations.

A fifth aspect, combinable with any of the previous or following aspects, wherein generating the analytic residual wavefields comprises: generating synthetic reflection data based on source wavefields, background velocity, and the initial reflectivity model; generating residual data based on the synthetic reflection data and the set of seismic data; and generating the analytic residual wavefields based on the residual data.

A sixth aspect, combinable with any of the previous or following aspects, the operations further comprising: scaling the synthetic reflection data; and wherein the residual data are generated based on the scaled synthetic reflection data.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), a FPGA (field programmable gate array), or an ASIC (application-specific integrated circuit). In some implementations, the data processing apparatus or special purpose logic circuitry may be hardware-based or software-based. The apparatus can optionally include code that creates an execution environment for computer programs, for example, code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, or IOS.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, or libraries. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business or dynamic information, and any other appropriate information including any parameters, variables, algorithms, instructions, rules, constraints, or references thereto. Additionally, the memory may include any other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity or a multi-touch screen using capacitive or electric sensing. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication, for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20, and all or a portion of the Internet. The network may communicate with, for example, Internet Protocol (IP) packets, Frame Relay frames, Asynchronous Transfer Mode (ATM) cells, voice, video, data, or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software, may interface with each other or the interface using an application programming interface (API) or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API or service layer may be an integral or a stand-alone component in relation to other components of the computing system. Moreover, any or all parts of the service layer may be implemented as sub-modules of another software module, enterprise application, or hardware module without departing from the scope of this disclosure.

While this specification contains many specific implementation details, these should not be construed as limitations on the scope of any disclosure or on the scope of what may be claimed, but rather as descriptions of features that may be specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation or integration of various system modules and components in the implementations described previously should not be understood as requiring such separation or integration in all implementations, and it should be understood that the described program components and systems can generally be integrated together in a single software product or packaged into multiple software products.

Accordingly, the previous description of example implementations does not define or constrain this disclosure. Other changes, substitutions, and alterations are also possible without departing from the spirit and scope of this disclosure.

What is claimed is:

1. A computer-implemented method for generating a reflectivity model for a subsurface area, comprising:
    receiving, by a data processing apparatus, a set of seismic data associated with the subsurface area;
    generating, by the data processing apparatus, analytic source wavefields;
    generating, by the data processing apparatus, analytic residual wavefields based on the set of seismic data and an initial reflectivity model;
    decomposing the analytic source wavefields and the analytic residual wavefields to obtain down-going and up-going components of the analytic source wavefields and the analytic residual wavefields;
    calculating, by the data processing apparatus, a gradient vector using the down-going components of the analytic source wavefields and the up-going components of the analytic residual wavefields;

calculating, by the data processing apparatus, a source illumination factor using the down-going components of the analytic source wavefields;

calculating, by the data processing apparatus, a preconditioned gradient vector, based on the gradient vector and the source illumination factor;

generating, by the data processing apparatus, an updated reflectivity model based on the preconditioned gradient vector; and generating, by the data processing apparatus, an image of the subsurface area based on the updated reflectivity model.

2. The method of claim 1, further comprising:

using an iterative process to generate a refined reflectivity model, wherein the iterative process comprises a plurality of iterations, each of the plurality of iterations comprises generating the analytic source wavefields and the analytic residual wavefields, decomposing the analytic source wavefields and the analytic residual wavefields, and calculating the gradient vector, the source illumination factor, and the preconditioned gradient vector, and in each of the plurality of iterations, the initial reflectivity model is replaced by the updated reflectivity model generated in a previous iteration.

3. The method of claim 2, further comprising: using the refined reflectivity model to generate a final reflectivity model using undecomposed source wavefields and undecomposed residual wavefields.

4. The method of claim 2, wherein each of the plurality of iterations comprises:

determining a misfit error of the respective iteration; and determining whether to stop the iteration process based on the misfit error.

5. The method of claim 1, wherein the analytic source wavefields and the analytic residual wavefields are generated using Hilbert transformations.

6. The method of claim 1, wherein generating the analytic residual wavefields comprises:

generating synthetic reflection data based on source wavefields, background velocity, and the initial reflectivity model;

generating residual data based on the synthetic reflection data and the set of seismic data; and generating the analytic residual wavefields based on the residual data.

7. The method of claim 6, further comprising:

scaling the synthetic reflection data; and wherein the residual data are generated based on the scaled synthetic reflection data.

8. A non-transitory computer-readable medium storing instructions which, when executed, cause a computer system to perform operations comprising:

receiving, by a data processing apparatus, a set of seismic data associated with a subsurface area;

generating, by the data processing apparatus, analytic source wavefields;

generating, by the data processing apparatus, analytic residual wavefields based on the set of seismic data and an initial reflectivity model;

decomposing the analytic source wavefields and the analytic residual wavefields to obtain down-going and up-going components of the analytic source wavefields and the analytic residual wavefields;

calculating, by the data processing apparatus, a gradient vector using the down-going components of the analytic source wavefields and the up-going components of the analytic residual wavefields;

calculating, by the data processing apparatus, a source illumination factor using the down-going components of the analytic source wavefields;

calculating, by the data processing apparatus, a preconditioned gradient vector, based on the gradient vector and the source illumination factor;

generating, by the data processing apparatus, an updated reflectivity model based on the preconditioned gradient vector; and generating, by the data processing apparatus, an image of the subsurface area based on the updated reflectivity model.

9. The non-transitory computer-readable medium of claim 8, the operations further comprising:

using an iterative process to generate a refined reflectivity model, wherein the iterative process comprises a plurality of iterations, each of the plurality of iterations comprises generating the analytic source wavefields and the analytic residual wavefields, decomposing the analytic source wavefields and the analytic residual wavefields, and calculating the gradient vector, the source illumination factor, and the preconditioned gradient vector, and in each of the plurality of iterations, the initial reflectivity model is replaced by the updated reflectivity model generated in a previous iteration.

10. The non-transitory computer-readable medium of claim 9, further comprising: using the refined reflectivity model to generate a final reflectivity model using undecomposed source wavefields and undecomposed residual wavefields.

11. The non-transitory computer-readable medium of claim 9, wherein each of the plurality of iterations comprises:

determining a misfit error of the respective iteration; and determining whether to stop the iteration process based on the misfit error.

12. The non-transitory computer-readable medium of claim 8, wherein the analytic source wavefields and the analytic residual wavefields are generated using Hilbert transformations.

13. The non-transitory computer-readable medium of claim 8, wherein generating the analytic residual wavefields comprises:

generating synthetic reflection data based on source wavefields, background velocity, and the initial reflectivity model;

generating residual data based on the synthetic reflection data and the set of seismic data; and generating the analytic residual wavefields based on the residual data.

14. The non-transitory computer-readable medium of claim 13, the operations further comprising:

scaling the synthetic reflection data; and wherein the residual data are generated based on the scaled synthetic reflection data.

15. A device, comprising:

at least one hardware processor; and a non-transitory computer-readable storage medium coupled to the at least one hardware processor and storing programming instructions for execution by the at least one hardware processor, wherein the programming instructions, when executed, cause the at least one hardware processor to perform operations comprising:

receiving a set of seismic data associated with a subsurface area;

generating analytic source wavefields;

generating analytic residual wavefields based on the set of seismic data and an initial reflectivity model;

decomposing the analytic source wavefields and the analytic residual wavefields to obtain down-going and up-going components of the analytic source wavefields and the analytic residual wavefields;

calculating a gradient vector using the down-going components of the analytic source wavefields and the up-going components of the analytic residual wavefields;

calculating a source illumination factor using the down-going components of the analytic source wavefields;

calculating a preconditioned gradient vector, based on the gradient vector and the source illumination factor;

generating an updated reflectivity model based on the preconditioned gradient vector; and generating an image of the subsurface area based on the updated reflectivity model.

16. The device of claim 15, the operations further comprising:

using an iterative process to generate a refined reflectivity model, wherein the iterative process comprises a plurality of iterations, each of the plurality of iterations comprises generating the analytic source wavefields and the analytic residual wavefields, decomposing the analytic source wavefields and the analytic residual wavefields, and calculating the gradient vector, the source illumination factor, and the preconditioned gradient vector, and in each of the plurality of iterations, the initial reflectivity model is replaced by the updated reflectivity model generated in a previous iteration.

17. The device of claim 16, further comprising: using the refined reflectivity model to generate a final reflectivity model using undecomposed source wavefields and undecomposed residual wavefields.

18. The device of claim 16, wherein each of the plurality of iterations comprises:

determining a misfit error of the respective iteration; and determining whether to stop the iteration process based on the misfit error.

19. The device of claim 15, wherein the analytic source wavefields and the analytic residual wavefields are generated using Hilbert transformations.

20. The device of claim 15, wherein generating the analytic residual wavefields comprises:

generating synthetic reflection data based on source wavefields, background velocity, and the initial reflectivity model;

generating residual data based on the synthetic reflection data and the set of seismic data; and generating the analytic residual wavefields based on the residual data.

* * * * *